United States Patent
Bashyam

(10) Patent No.: US 11,670,778 B2
(45) Date of Patent: Jun. 6, 2023

(54) ELECTRODES WITH IMPROVED CELL REVERSAL TOLERANCE THROUGH FUNCTIONALIZED AND STABILIZED METAL OXIDES

(71) Applicant: HYZON MOTORS INC., Honeoye Falls, NY (US)

(72) Inventor: Rajesh Bashyam, Delta (CA)

(73) Assignee: HYZON MOTORS INC., Honeoye Falls, NY (US)

( * ) Notice: Subject to any disclaimer, the term of this patent is extended or adjusted under 35 U.S.C. 154(b) by 0 days.

(21) Appl. No.: 17/471,220

(22) Filed: Sep. 10, 2021

(65) Prior Publication Data

US 2022/0102734 A1 Mar. 31, 2022

Related U.S. Application Data

(60) Provisional application No. 63/084,177, filed on Sep. 28, 2020.

(51) Int. Cl.
| | |
|---|---|
| *H01M 4/88* | (2006.01) |
| *H01M 8/1004* | (2016.01) |
| *H01M 4/90* | (2006.01) |

(52) U.S. Cl.
CPC ....... *H01M 4/8882* (2013.01); *H01M 4/9016* (2013.01); *H01M 8/1004* (2013.01)

(58) Field of Classification Search
None
See application file for complete search history.

(56) References Cited

U.S. PATENT DOCUMENTS

| | | |
|---|---|---|
| 2004/0038808 A1 | 2/2004 | Hampden-Smith et al. |
| 2011/0151356 A1 | 6/2011 | Adzic et al. |
| 2013/0330659 A1 | 12/2013 | Horikita et al. |
| 2014/0220237 A1 | 8/2014 | Gross et al. |
| 2014/0309592 A1 | 10/2014 | Melvin et al. |
| 2016/0097134 A1 | 4/2016 | Azad |
| 2017/0283965 A1 | 10/2017 | Nam et al. |
| 2019/0181457 A1 | 6/2019 | Bashyam et al. |

FOREIGN PATENT DOCUMENTS

WO 2020076798 A1 4/2020

OTHER PUBLICATIONS

Written Opinion of the International Searching Authority dated Dec. 7, 2021.

*Primary Examiner* — Haroon S. Sheikh
(74) *Attorney, Agent, or Firm* — Jacob M. Ward; Ward Law Office LLC

(57) ABSTRACT

A method for manufacturing a functionalized metal oxide product configured to be used in an anode catalyst layer of a fuel cell can include forming a catalyst solution, which can include mixing a metal oxide in water. A stock solution can be formed by mixing a fatty acid in water. The stock solution can be added to the catalyst solution to form a solid fraction and a liquid fraction. The solid fraction can be removed from the liquid fraction. The solid fraction can be washed and dried, thereby forming the functionalized metal oxide product. The functionalized metal oxide product is configured to improve the cell reversal tolerance of the fuel cell.

19 Claims, 2 Drawing Sheets

Figure 1:
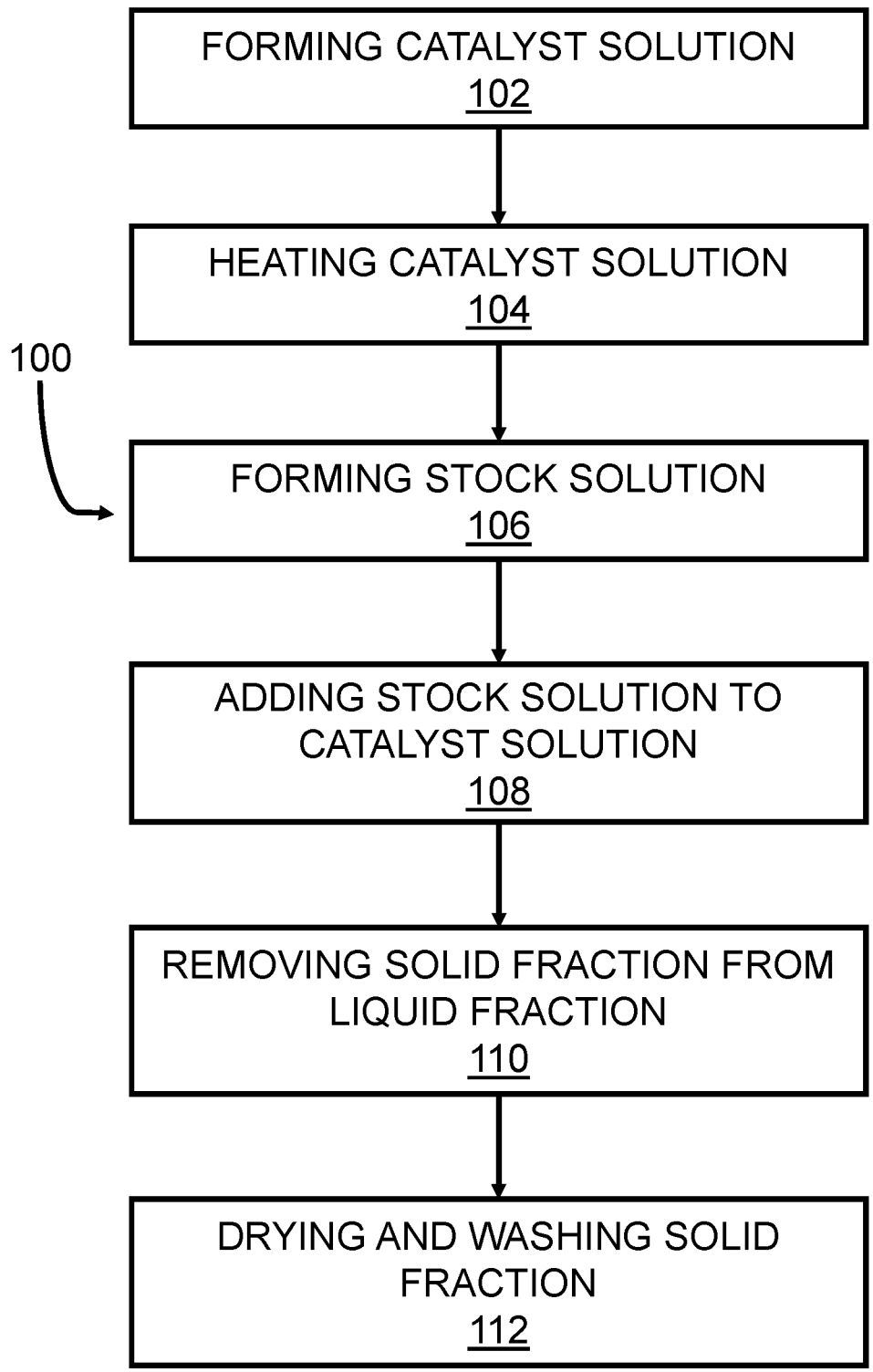

ELECTRODES WITH IMPROVED CELL REVERSAL TOLERANCE THROUGH FUNCTIONALIZED AND STABILIZED METAL OXIDES

CROSS-REFERENCE TO RELATED APPLICATIONS

This application claims the benefit of U.S. Provisional Application No. 63/084,177, filed on Sep. 28, 2020. The entire disclosure of the above application is incorporated herein by reference.

FIELD

The present technology relates to fuel cell catalysts, and more particularly, to fuel cell catalysts with improved cell reversal tolerance.

INTRODUCTION

This section provides background information related to the present disclosure which is not necessarily prior art.

Fuel cell systems are currently being developed for use as power supplies in numerous applications, such as vehicles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Polymer electrolyte membrane fuel cells (PEM fuel cells) employ a membrane electrode assembly (MEA), which includes a polymer electrolyte or ion-exchange membrane disposed between two electrodes, namely a cathode and an anode. A catalyst typically induces the desired electrochemical reactions at the electrodes. Separator plates or bipolar plates, including plates providing a flow field for directing the reactants across a surface of each electrode substrate, are disposed on each side of the MEA.

In operation, the output voltage of an individual fuel cell under load can be below one volt. Therefore, in order to provide greater output voltage, multiple cells can be stacked together and are connected in series to create a higher voltage fuel cell stack. End plate assemblies can be placed at each end of the stack to hold the stack together and to compress the stack components together. Compressive force can provide sealing and adequate electrical contact between various stack components. Fuel cell stacks can then be further connected in series and/or parallel combinations to form larger arrays for delivering higher voltages and/or currents.

In practice, fuel cells need to be robust to varying operating conditions, especially in applications that impose numerous on-off cycles and/or require dynamic, load-following power output, such as those found in vehicle applications. For example, fuel cell anode catalysts preferably should be tolerant to cell voltage reversals and carbon monoxide poisoning, while carbon-supported catalysts preferably should be resistant to corrosion during start up and shutdown procedures.

Cell reversal tolerance is generally an out-of-specification requirement for improving fuel cell stack robustness during reactant starvation, especially hydrogen starvation. Voltage reversals can occur when a fuel cell in a series stack cannot generate sufficient current to keep up with the rest of the cells in the series stack. Several conditions can lead to voltage reversal in a PEM fuel cell, including, for example, insufficient oxidant, insufficient fuel, and certain issues with cell components or construction. Voltage reversal generally occurs when one or more cells experience a more extreme level of one of these conditions compared to other cells in the stack. While each of these conditions can result in negative fuel cell voltages, the mechanisms and consequences of such a reversal may differ depending on which condition caused the reversal.

Groups of cells within a stack can also undergo voltage reversal and even entire stacks can be driven into voltage reversal by other stacks in an array. Aside from the loss of power associated with one or more cells going into voltage reversal, this situation poses operational and performance concerns. Undesirable electrochemical reactions may occur, which may detrimentally affect fuel cell components. Component degradation can reduce the reliability and performance of the affected fuel cell, and in turn, its associated stack and array. For example, hydrogen starvation can happen during cold start or due to manifold issues. Hydrogen starvation can lead to cell reversal either in one or many cells in a stack and increase the anode potential (e.g., to over 1.4 V), which can lead to oxidation/corrosion of catalyst and other MEA components, where a rapid oxidation event can even damage the membrane of a PEM fuel cell.

Fuel cells can be made more tolerant to cell reversal in various ways. For example, water electrolysis can be promoted over anode component oxidation at the anode, which can be accomplished by incorporating an additional catalyst composition at the anode to promote the water electrolysis reaction. As a result, more of the current forced through the fuel cell during voltage reversal can be consumed in the electrolysis of water rather than the oxidation of anode components. Ruthenium-based fuel cell catalysts can be used to this end for mitigating voltage reversals. Examples of water electrolysis catalysts include Pt—Ru alloys, $RuO_2$, other metal oxide mixtures, and/or solid solutions including Ru.

Other approaches to improving cell voltage reversal tolerance include using anodes employing both a higher catalyst loading (e.g., at least 60 wt % catalyst) on an optional corrosion-resistant support, as well as incorporating certain unsupported catalyst compositions to promote the water electrolysis reaction. Compositions can include metal oxides characterized by the chemical formulae $RuO_x$ and $IrO_x$, where x is greater than 1 and particularly about 2, and wherein the atomic ratio of Ru to Ir is greater than about 70:30, and particularly about 90:10.

Ruthenium and Ru-containing compositions can be unstable under certain fuel cell operating conditions. For example, ruthenium has been shown to crossover from Pt—Ru black catalyst and redeposit at the Pt cathode catalyst in direct methanol fuel cells (DMFC) and hydrogen/air fuel cells under abnormal conditions, such as cell reversal resulting in very high anode potentials, as well as under normal DMFC operating conditions.

Accordingly, there is a continuing need for ways to improve cell reversal tolerance of a fuel cell.

SUMMARY

In concordance with the instant disclosure, ways of preparing and using a composition of functionalized and stabilized metal oxides are provided that improve cell reversal tolerance of a fuel cell, has surprisingly been discovered.

In one embodiment, a method for manufacturing a functionalized metal oxide product configured to be used in an anode catalyst layer of a fuel cell can include forming a catalyst solution, which can include mixing a metal oxide in water. A stock solution can be formed by mixing a fatty acid in water. The stock solution can be added to the catalyst solution to form a solid fraction and a liquid fraction. The solid fraction can be removed from the liquid fraction. The solid fraction can be washed and dried, thereby forming the functionalized metal oxide product.

According to the present technology, certain metal oxides, such as iridium oxide, ruthenium oxide, ruthenium iridium oxide, and supported composite metal oxides, such as composites of iridium oxide and niobium oxide (e.g. $IrO_2/Nb_2O_5$), can be surface functionalized to improve the cell reversal tolerance and stability of the metal oxides. Increasing cell reversal times can minimize loading of a precious metal catalyst, where increased stability of the functionalized and stabilized metal oxides can not only lead to reduced dissolution of the metal oxides, but also can militate against performance degradation due to contamination. Certain embodiments include where the present compositions can be employed in an anode catalyst layer of a fuel cell with a Pt/C catalyst for improving cell reversal tolerance.

Further areas of applicability will become apparent from the description provided herein. The description and specific examples in this summary are intended for purposes of illustration only and are not intended to limit the scope of the present disclosure.

DRAWINGS

This section provides background information related to the present disclosure which is not necessarily prior art.

Figure 2:
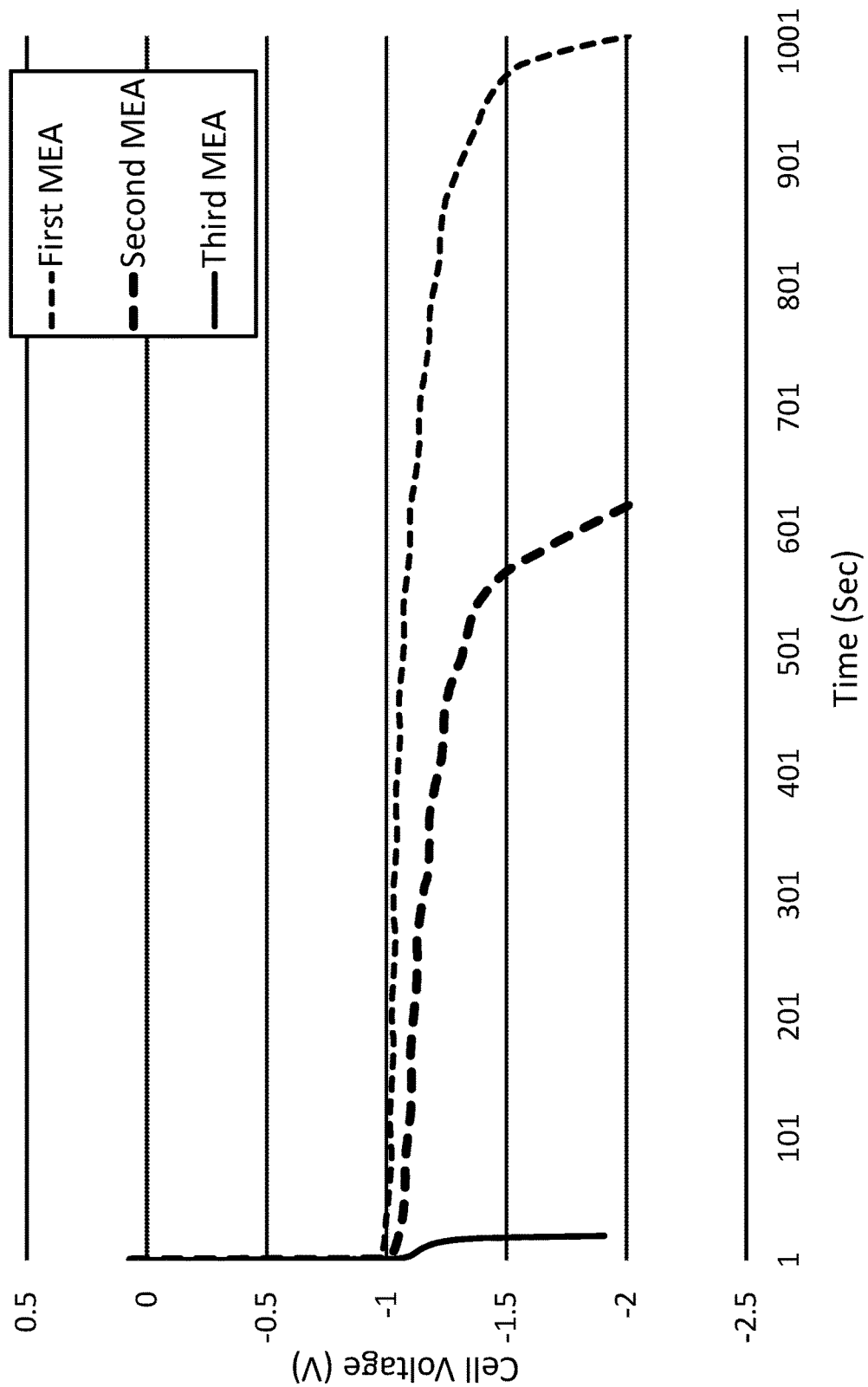

FIG. 1 is a flow chart depicting a method of manufacturing a functionalized metal oxide product, according to one embodiment of the present disclosure; and FIG. 2 is a graph depicting a cell reversal tolerance of three membrane electrode assemblies, depicting an enhanced cell reversal tolerance of a membrane electrode assembly, which includes an anode catalyst layer manufactured by a method of one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

The present technology improves the cell reversal tolerance of a fuel cell, as described in greater detail hereinbelow. In particular, according to the present technology, certain metal oxides, such as iridium oxide, iridium ruthenium oxide, ruthenium iridium oxide, iridium oxide/niobium oxide can be surfaced functionalized to improve cell reversal tolerance and stability of the metal oxides. Particular metal oxide examples iridium oxide, ruthenium oxide, ruthenium iridium oxide, and supported composite metal oxides, such as composites of iridium oxide and niobium oxide. The functionalized metal oxide can be employed in an anode catalyst layer with a platinum on carbon (Pt/C) catalyst.

The present technology includes the covalent functionalization of water electrolysis catalysts through self-assembly of long-chain saturated or unsaturated fatty acids (e.g., C12 to C26) and alkali metal carboxylates thereof. Examples include sodium or potassium salts of C12 to C26 carbon chain fatty acids, preferably including fatty acids having C16 to C22 carbon chains. Some examples of saturated fatty acids include one or more of lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, and cerotic acid. Some examples of unsaturated fatty acids include one or more of α-linolenic acid, stearidonic acid, eicosapentaenoic acid, cervonic acid, linoleic acid, linolelaidic acid, γ-linolenic acid, dihomo-γ-linolenic acid, arachidonic acid, docosatetraenoic acid, palmitoleic acid, vaccenic acid, paullinic acid, oleic acid, elaidic acid, gondoic acid, erucic acid, nervonic acid, and mead acid. Certain examples of fatty acid salts include a laurate, a palmitate, a stearate, a lignocerate, a cerotate, an oleate, a gondoate, a nervonate, and combinations thereof.

The composition can be manufactured according to a method 100, for example, as shown in FIG. 1. The method 100 can include a first step 102 of forming a metal oxide solution. In particular, the water electrolysis catalyst, such as iridium oxide, ruthenium oxide, ruthenium iridium oxide, and supported composite metal oxides, such as composites of iridium oxide and niobium oxide can be dispersed or otherwise mixed into water. The metal oxide solution can be stirred continuously. A second step 104 of the method can be heating the metal oxide solution. In particular, the metal oxide solution can be mixed at a temperature from about 55° C. to about 80° C. This resultant solution is referred to herein as "the catalyst solution." A concentration of the catalyst solution can be about 40 mg/mL, as a non-limiting example.

A third step 106 of the method can include forming a solution with one or more long-chain saturated or an unsaturated fatty acids or alkali metal carboxylates, such as, sodium or potassium salts of C12 to C26 carbon chains and, more particularly, C16 to C22 carbon chains. Non-limiting examples of such saturated compounds can include sodium laurate (C12), sodium palmitate (C16), sodium stearate (C18), sodium lignocerate (C24) and sodium cerotate (C26). Non-limiting examples of such unsaturated compounds can include sodium palmitate (C16), sodium oleate (C18), sodium gondoate (C20), and sodium nervonate (C24). In particular, the step 106 can include heating water at a temperature from about 55° C. to about 75° C. The fatty acid can be mixed into the heated water and the fatty acid or fatty acid salt until dissolved. This resultant sodium stearate solution is referred to herein as "the stock solution." A concentration of the stock solution can be about 10 mg/mL.

A fourth step 108 in the method 100 can include adding the stock solution to the catalyst solution. In particular, a predetermined amount of the stock solution can be added to a predetermined amount of the catalyst stock solution. A percent loading of the stock solution in the catalyst solution that can be targeted include 1.5%, 3.0%, 5.0% and 10.0% of the total volume, as non-limiting examples. The resultant mixture can be stirred and heated for a predetermined amount of time and then cooled, which can result in a liquid fraction and a solid fraction.

In a fifth step of the method 100, the solid fraction can be removed from the liquid fraction. This step 110 can include a filtration process or a centrifugation process, as non-limiting examples. A sixth step 112 of the method 100 can include washing and drying the solids. The resultant powder is the functionalized metal oxide, which can be employed in an anode catalyst layer with a Pt/C catalyst for improving cell reversal tolerance.

The present disclosure also includes a functionalized metal oxide product, which is manufactured according to the method 100. A skilled artisan can utilize the functionalized metal oxide for the anode catalyst layer in suitable loadings, as desired.

The functionalized metal oxide product can exhibit hydrophobic properties. While being bound to no particular theory, it is believed that the hydrophobic properties of the functionalized metal oxide product allow for enhanced cell reversal tolerance in the functionalized metal oxide product.

The present disclosure further includes a fuel cell with an anode catalyst layer, which includes the functionalized metal oxide product. It should be appreciated that fuel cell can be manufactured according to known methods. The functionalized metal oxide product can be used in conjunction with a platinum on carbon anode of the fuel cell. In a most particular example, as also described hereinbelow, the functionalized metal oxide product can be used in the anode catalyst layer of a membrane electrode assembly.

EXAMPLE

The following example protocol was used to produce the functionalized metal oxide by the method 100.

Two (2) grams of water electrolysis catalyst can be dispersed in about 50 mL deionized water. A resulting solution can be sonicated for about 20 minutes. In particular, a probe sonicator can be set to 60% amplitude and can be cycled at one second on and three seconds off for the duration of the 20 minutes. After sonication, the solution can be placed in an overhead stirrer and stirred continuously to militate against a settling of particles. The solution can be heated to about 65° C. to about 70° C. to form the catalyst solution.

A beaker can be filled with 100 mL deionized water and the water can be heated to about 65° C. Then, about one (1) g of sodium stearate can be stirred into the heated water it dissolves. The solution can be stirred by an overhead stirrer or a magnetic bar. Once the sodium stearate is dissolved, the solution can be removed from the heat to form the stock solution.

The percent loading of the stock solution in the catalyst solution can be 1.5%, which corresponds to 30.4 mg of sodium stearate. Where the 1.5% loading of sodium stearate is required, 3.04 mL of the stock solution can be used. The 3.04 mL of stock solution can be added dropwise to the catalyst solution via a dropper, with overhead stirring and heat for 30 minutes. After 30 minutes, the heat can be stopped, and the solution can be cooled. The solution can be either filtered or centrifuged. The solids can be washed and dried at 80° C. for 3 hours or until a free-flowing powder is formed. The resulting powder is the functionalized metal oxide product, which can be employed in an anode catalyst layer with a Pt/C catalyst for improving cell reversal tolerance.

The functionalization can be qualitatively confirmed by dispersing a small amount of the powder in water. The self-assembly of the long-chain fatty chain modifier will induce hydrophobicity to the metal oxides and the powder will float on the water. The carboxylate group is bound to the metal oxide(s) and the long-chain carbon portion can induce hydrophobicity. The optimum content of the modifier varies with respect to the parent metal oxide properties, such as surface area and particle size.

Samples of the functionalized metal oxide product with about 5% to 10% sodium stearate showed good hydrophobicity and floated in water even under sonication. However, the hydrophobicity can depend on the type of metal oxide material and its surface area. In certain metal oxide materials, even lower than 5% fatty acid salt can be enough for hydrophobicity.

EXPERIMENTAL

The cell reversal tolerance of the functionalized metal oxide manufactured according to the method 100 was tested against other catalyst compositions.

In particular, three (3) membrane electrode assemblies were manufactured. Each of the three membrane assemblies includes an anode catalyst layer. A first membrane electrode assembly included the functionalized metal oxide manufactured according to the method 100 as the anode catalyst layer. A second membrane electrode assembly included a commercially available cell reversal tolerant catalyst as the anode catalyst layer. A third membrane electrode assembly included an anode catalyst layer without a cell reversal tolerant catalyst.

Each of the membrane electrode assemblies includes the same cathode catalyst layer, membrane, and gas diffusion layer. Each of the first and second membrane electrode assemblies included substantially the same loading of the respective catalyst layers. The cell reversal tolerance for each of the membrane electrode assemblies were tested under the following conditions:

| | |
|---|---|
| Anode | Dry $N_2$ |
| Cathode | Humidified air |
| Anode Pressure | Ambient |
| Cathode Pressure | Ambient |
| Anode Flow | 1 L/min |
| Cathode Flow | 1 L/min |
| Cell Temperature | 75° C. |
| Reversal Current Density | 0.2 A/cm$^2$ |
| Cut Off Voltage | −2.0 V |

As shown in FIG. 2, the cell reversal tolerance of the first membrane electrode assembly showed enhanced cell reversal tolerance compared to each of the second membrane electrode assembly and the third membrane electrode assembly. Accordingly, the functionalized oxide manufactured according to the method 100 of the present disclosure showed enhanced cell reversal tolerance by providing a greater time until cell reversal compared to commercially available catalyst compounds, including those configured to improve cell reversal tolerance.

Advantageously, the functionalized metal oxide product of the present disclosure can improve the cell reversal tolerance and stability of the metal oxide. Increasing the cell reversal time can help to reduce the loading of precious metals. Increasing the stability of the metal oxide can lead not only to a reduction in the dissolution of the metal oxides, but also can militate against the performance degradation due to contamination of the fuel cell.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method for making a functionalized metal oxide product configured to be used in an anode catalyst layer of a fuel cell, comprising:
    providing an aqueous catalyst solution including a metal oxide;
    providing an aqueous stock solution including a fatty acid or salt thereof; and
    adding the stock solution to the catalyst solution, resulting in a liquid fraction and a solid fraction, the solid fraction including the functionalized metal oxide product,
    wherein a percent loading of the aqueous stock solution in the catalyst solution includes one of 1.5%, 3.0%, 5.0% and 10.0% of the total volume.

2. The method of claim 1, further comprising separating the solid fraction from the liquid fraction.

3. The method of claim 2, further comprising washing and drying the solid fraction.

4. The method of claim 1, wherein the metal oxide includes iridium oxide, ruthenium oxide, ruthenium iridium oxide, and composites of iridium oxide and niobium oxide, and combinations thereof.

5. The method of claim 1, wherein the fatty acid or salt thereof includes a sodium or a potassium fatty acid salt.

6. The method of claim 1, wherein the fatty acid or salt thereof includes a fatty acid salt selected from a group consisting of a stearate, an oleate, and combinations thereof.

7. The method of claim 1, wherein the fatty acid or salt thereof includes a fatty acid with a carbon chain of C12 to C26.

8. The method of claim 1, wherein the fatty acid or salt thereof includes a fatty acid with a carbon chain from C16 to C22.

9. The method of claim 1, further comprising a step of heating the aqueous catalyst solution.

10. The method of claim 9, wherein the aqueous catalyst solution is heated to between about 55° C. to about 80° C.

11. The method of claim 1, further comprising heating the aqueous stock solution.

12. The method of claim 11, wherein the aqueous stock solution is heated to between about 55° C. to about 75° C.

13. The method of claim 1, wherein the fatty acid or salt thereof includes sodium stearate.

14. A functionalized metal oxide product formed according to the method of claim 1.

15. A membrane electrode assembly including the functionalized metal oxide product formed according to the method of claim 1.

16. A fuel cell having an anode catalyst layer including the functionalized metal oxide formed according to the method of claim 1.

17. A method for making a functionalized metal oxide product configured to be used in an anode catalyst layer of a fuel cell, comprising:
    providing an aqueous catalyst solution including a metal oxide;
    providing an aqueous stock solution including a fatty acid or salt thereof; and adding the stock solution to the catalyst solution, resulting in a liquid fraction and a solid fraction, the solid fraction including the functionalized metal oxide product, wherein the aqueous catalyst solution has a metal oxide concentration of 40 mg/mL.

18. A method for making a functionalized metal oxide product configured to be used in an anode catalyst layer of a fuel cell, comprising:
   providing an aqueous catalyst solution including a metal oxide;
   providing an aqueous stock solution including a fatty acid or salt thereof; and
   adding the stock solution to the catalyst solution, resulting in a liquid fraction and a solid fraction, the solid fraction including the functionalized metal oxide product,
   wherein the aqueous stock solution has a fatty acid or salt thereof concentration of 10 mg/mL.

19. A method for making a functionalized metal oxide product configured to be used in an anode catalyst layer of a fuel cell, comprising:
   providing an aqueous catalyst solution including a metal oxide;
   providing an aqueous stock solution including a fatty acid or salt thereof; and
   adding the stock solution to the catalyst solution, resulting in a liquid fraction and a solid fraction, the solid fraction including the functionalized metal oxide product,
   wherein the metal oxide includes iridium oxide, ruthenium oxide, ruthenium iridium oxide, and composites of iridium oxide and niobium oxide, and combinations thereof, the fatty acid or salt thereof includes a saturated or unsaturated carbon chain of C12 to C26, the aqueous catalyst solution has a metal oxide concentration of 40 mg/mL, and the aqueous stock solution has a fatty acid or salt thereof concentration of 10 mg/mL.

\* \* \* \* \*